United States Patent
Kim et al.

(10) Patent No.: US 10,942,612 B2
(45) Date of Patent: Mar. 9, 2021

(54) TOUCH PANEL AND DISPLAY DEVICE INCLUDING THE SAME

(71) Applicant: Samsung Display Co., Ltd., Yongin-Si (KR)

(72) Inventors: Jeongyoung Kim, Gyeongsangbuk-do (KR); Donghwan Kim, Seongnam-si (KR); Yoongyu Lee, Seoul (KR); Seongmo Hwang, Seongnam-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 15/597,980

(22) Filed: May 17, 2017

(65) Prior Publication Data

US 2018/0059837 A1    Mar. 1, 2018

(30) Foreign Application Priority Data

Aug. 30, 2016   (KR) ......................... 10-2016-0110632

(51) Int. Cl.
*G06F 3/041* (2006.01)
*G06F 3/044* (2006.01)

(52) U.S. Cl.
CPC .......... *G06F 3/0446* (2019.05); *G06F 3/0412* (2013.01); *G06F 3/0443* (2019.05); *G06F 2203/04112* (2013.01)

(58) Field of Classification Search
CPC ......... G06F 2203/04112; G06F 3/0412; G06F 3/044; G06F 3/016; G06F 3/0446; G06F 3/0443; G06F 3/0448; G02F 1/134309; G09B 21/004
See application file for complete search history.

(56) References Cited

U.S. PATENT DOCUMENTS

| | | | |
|---|---|---|---|
| 2014/0184560 A1 | 7/2014 | Adachi | |
| 2014/0293154 A1 | 10/2014 | Philipp | |
| 2015/0205424 A1 | 7/2015 | Park et al. | |
| 2015/0355752 A1* | 12/2015 | Kurasawa | G06F 3/0412 345/174 |
| 2016/0132153 A1* | 5/2016 | Lin | G06F 3/0446 345/174 |

(Continued)

FOREIGN PATENT DOCUMENTS

| | | |
|---|---|---|
| EP | 2592533 A1 | 5/2013 |
| KR | 2014-0010788 A | 7/2012 |

(Continued)

OTHER PUBLICATIONS

Extended European Search Report corresponding to EP Application No. 17187402.7, dated Feb. 5, 2018, 11 pages.

*Primary Examiner* — Patrick N Edouard
*Assistant Examiner* — Douglas M Wilson
(74) *Attorney, Agent, or Firm* — Innovation Counsel LLP

(57) ABSTRACT

A touch panel includes: a substrate; a plurality of sensor electrodes disposed on the substrate; and a dummy pattern disposed on the substrate among the plurality of sensor electrodes. Each of the sensor electrode includes a plurality of first mesh patterns extending in a first direction and a plurality of second mesh patterns connecting adjacent ones of the plurality of first mesh patterns in a second direction, and the dummy pattern includes a plurality of third mesh patterns extending in the first direction and one or more disconnected portions on an extension path of the plurality of third mesh patterns.

23 Claims, 23 Drawing Sheets

(56) References Cited

U.S. PATENT DOCUMENTS

| | | | |
|---|---|---|---|
| 2016/0239120 A1 | 8/2016 | Jeong et al. | |
| 2016/0246393 A1 | 8/2016 | Lee et al. | |
| 2016/0274727 A1* | 9/2016 | Nakamura | G06F 3/044 |

FOREIGN PATENT DOCUMENTS

| | | |
|---|---|---|
| KR | 2013-0035243 A | 4/2013 |
| KR | 10-1363361 B1 | 2/2014 |
| KR | 2014-0086888 A | 7/2014 |
| KR | 10-1449947 B1 | 10/2014 |
| KR | 2015-0026042 A | 3/2015 |
| KR | 2016-0019002 A | 2/2016 |
| WO | WO2013-100450 A1 | 7/2013 |
| WO | WO2014-133347 A1 | 9/2014 |

* cited by examiner

TOUCH PANEL AND DISPLAY DEVICE INCLUDING THE SAME

CROSS-REFERENCE TO RELATED APPLICATION

This application claims priority under 35 U.S.C. § 119 to Korean Patent Application No. 10-2016-0110632, filed on Aug. 30, 2016, in the Korean Intellectual Property Office (KIPO), the disclosure of which is incorporated by reference herein in its entirety.

TECHNICAL FIELD

The present disclosure relates to a touch panel and a display device including the touch panel, and more particularly, to a touch panel providing improved display quality and a display device including the touch panel.

DISCUSSION OF RELATED ART

A touch panel is a device that can recognize the presence of a contact and the position of the contact by detecting contact of a contacting means such as a human finger or a stylus pen. As disposed on a display device, the touch panel may be used as an input means of the display device.

The touch panel may be applied in various display devices including a liquid crystal display ("LCD") device, a plasma display panel ("PDP") device, an organic light emitting diode ("OLED") display device, a compact portable terminal, an industrial terminal, a digital information device ("DID"), or the like.

Conventional touch panels typically include a driving electrode and a sensing electrode that are insulated from each other. The touch panels input a driving signal to the driving electrode and recognize the presence of a contact and the position of the contact based on a capacitance variation or a voltage variation that is measured by the sensing electrode.

Conventional touch panels may have a relatively large thickness due to a structure in which the driving electrode and the sensing electrode are disposed on different layers, and an insulating layer is disposed between the driving electrode and the sensing electrode. Accordingly, a structure is suggested whereby sensing electrodes are formed on a single layer into a mesh shape that has a thin line width.

The above information disclosed in this background section is only for enhancement of understanding of the background of the present disclosure, and, therefore, it may contain information that does not form a prior art that is already known to a person of ordinary skill in the art.

SUMMARY

Exemplary embodiments of the present disclosure may be directed to a touch panel with an improved display quality and a display device including the touch panel.

According to an exemplary embodiment of the present disclosure, a touch panel includes: a substrate; a plurality of sensor electrodes disposed on the substrate; and a dummy pattern disposed on the substrate among the plurality of sensor electrodes. Each of the sensor electrode includes a plurality of first mesh patterns extending in a first direction and a plurality of second mesh patterns connecting adjacent ones of the plurality of first mesh patterns in a second direction, and the dummy pattern includes a plurality of third mesh patterns extending in the first direction and one or more disconnected portions on an extension path of the plurality of third mesh patterns.

The dummy pattern and the plurality of sensor electrodes may be disposed on a same layer.

The dummy pattern may be spaced apart from the plurality of sensor electrodes in a plan view.

The touch panel may further include a plurality of routing wirings connected to the plurality of sensor electrodes, respectively.

The plurality of routing wirings and the plurality of sensor electrodes may have a substantially same pattern.

The dummy pattern may be disposed among the plurality of sensor electrodes and the plurality of routing wirings.

The dummy pattern may be disposed among the plurality of routing wirings.

The dummy pattern may be disposed at an edge portion of the substrate.

The dummy pattern may be disposed substantially in an entire area of the substrate except areas in which the plurality of sensor electrodes and the plurality of routing wirings are disposed.

The plurality of sensor electrodes may be disposed on the substrate in a matrix form.

Each of the plurality of sensor electrodes may have a shape selected from: a substantially quadrangular shape, a substantially triangular shape, a substantially lozenge shape, a substantially circular shape, a substantially elliptical shape, a substantially semicircular shape, a substantially polygonal shape, and any combination thereof.

The dummy pattern may further include a plurality of fourth mesh patterns connecting adjacent ones of the plurality of third mesh patterns.

Each of the plurality of fourth mesh patterns may be disconnected at one or more portions of the adjacent ones of the plurality of third mesh patterns.

Each of the plurality of first mesh patterns, the plurality of second mesh patterns, the plurality of third mesh patterns, and the plurality of fourth mesh patterns may include one or more of: indium tin oxide (ITO), indium zinc oxide (IZO), zinc oxide (ZnO), carbon nanotube (CNT), and graphene.

Each of the plurality of first mesh patterns may have one of a linear shape, a curved shape, and a zig-zag shape.

Each of the plurality of third mesh patterns may have one of a linear shape, a curved shape, and a zig-zag shape.

When an area of the sensor electrode with respect to a unit area of the substrate is defined as a first area ratio, and an area of the dummy pattern with respect to the unit area of the substrate is defined as a second area ratio, a ratio of the second area ratio to the first area ratio may be in a range of about 90% to about 100%.

When an area of the dummy pattern with respect to a unit area of the substrate is defined as a second area ratio, and an area of the routing wiring with respect to the unit area of the substrate is defined as a third area ratio, a ratio of the second area ratio to the third area ratio may be in a range of about 90% to about 100%.

According to an exemplary embodiment of the present disclosure, a display device includes: a display panel including a plurality of pixels; and a touch panel disposed on the display panel. The touch panel includes: a substrate; a plurality of sensor electrodes disposed on the substrate; and a dummy pattern disposed on the substrate among the plurality of sensor electrodes. Each of the plurality of sensor electrodes includes: a plurality of first mesh patterns extending in a first direction and a plurality of second mesh patterns connecting adjacent ones of the plurality of first mesh patterns in a second direction, and the dummy pattern includes a plurality of third mesh patterns extending in the first direction and one or more disconnected portions on an extension path of the plurality of third mesh patterns.

When an area of the sensor electrode with respect to a unit area of the substrate is defined as a first area ratio, and an area of the dummy pattern with respect to the unit area of the substrate is defined as a second area ratio, a ratio of the second area ratio to the first area ratio may be in a range of about 90% to about 100%.

The display device may further include a plurality of routing wirings connected to the plurality of sensor electrodes, respectively.

When an area of the dummy pattern with respect to a unit area of the substrate is defined as a second area ratio, and an area of the routing wiring with respect to the unit area of the substrate is defined as a third area ratio, a ratio of the second area ratio to the third area ratio may be in a range of about 90% to about 100%.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the present disclosure will become more apparent by describing in detail exemplary embodiments thereof with reference to the accompanying drawings, wherein.

DETAILED DESCRIPTION

Figure 1:
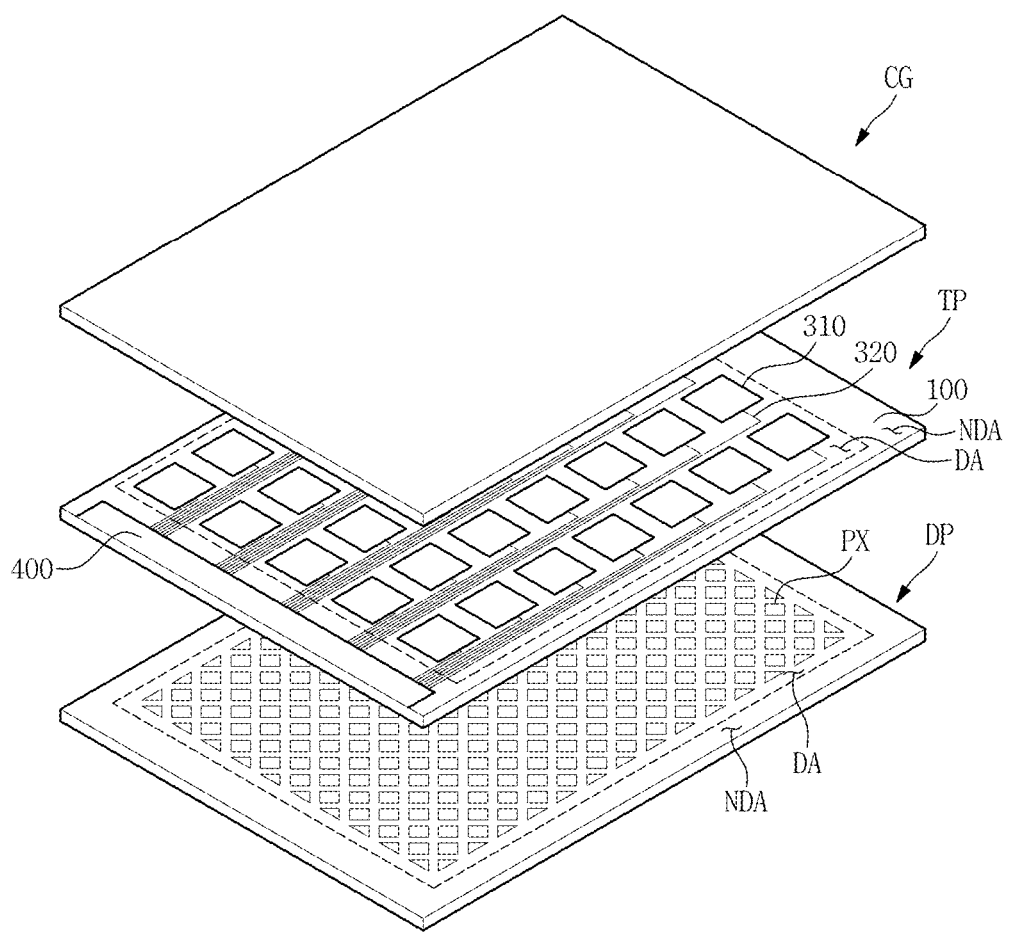
FIG. 1 is a schematic perspective view illustrating an exemplary embodiment of a display device, according to one embodiment.

Exemplary embodiments will now be described more fully hereinafter with reference to the accompanying drawings. Although the present disclosure can be modified in various manners and have several embodiments, exemplary embodiments are illustrated in the accompanying drawings and will be mainly described in the specification. However, the scope of the present disclosure is not limited to the exemplary embodiments and should be construed as including changes, equivalents, and substitutions in the spirit and scope of the present disclosure.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or one or more intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or one or more intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component. It will be understood that the spatially relative terms are intended to encompass different orientations of a device in use or operation, in addition to the orientation depicted in the drawings. For example, in the case where a device shown in a drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but may not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts that are not associated with the description may not be provided in order to specifically describe embodiments of the present disclosure, and like reference numerals refer to like elements throughout the specification.

FIG. 1 is a schematic perspective view illustrating an exemplary embodiment of a display device, according to one embodiment.

Referring to FIG. 1, the display device may include a display panel DP, a touch panel TP disposed on the display panel DP, and a cover glass CG disposed on the touch panel TP.

The display panel DP may be one of a liquid crystal display ("LCD") panel, an organic light emitting diode ("OLED") display panel, a plasma display panel ("PDP"), and an electrophoretic display panel.

The display panel DP may include a display area DA in which a plurality of pixels PX displaying images are disposed and a non-display area NDA surrounding the display area DA.

The plurality of pixels PX may be disposed in a matrix form.

According to one embodiment, the pixel PX has a substantially lozenge shape, but exemplary embodiments are not limited thereto. In an alternative exemplary embodiment, the pixel PX may have various shapes such as a substantially quadrangular shape, a substantially triangular shape, or a substantially polygonal shape.

Touch panel TP may be formed on a separate substrate 100 and then disposed on the display panel DP, but exemplary embodiments are not limited thereto. The touch panel TP may be an on-cell type touch panel that is directly disposed on the display panel DP without the separate substrate 100 or may be an in-cell type touch panel that is formed in the display panel DP.

The touch panel TP may include the substrate 100, a plurality of sensor electrodes 310 disposed on the substrate 100 in a matrix form, a plurality of routing wirings 320 connected to respective ones of the sensor electrodes 310, a touch driving unit 400. The touch panel TP may include a display area DA in which the plurality of sensor electrodes 310 are disposed and a non-display area NDA surrounding the display area DA. Descriptions pertaining to the touch panel TP will be descried in detail hereinbelow.

The cover glass CG may include or be formed of at least one or more of glass, sapphire, diamond, polymethylmethacrylate (PMMA), and polycarbonate (PC).

Figure 2:
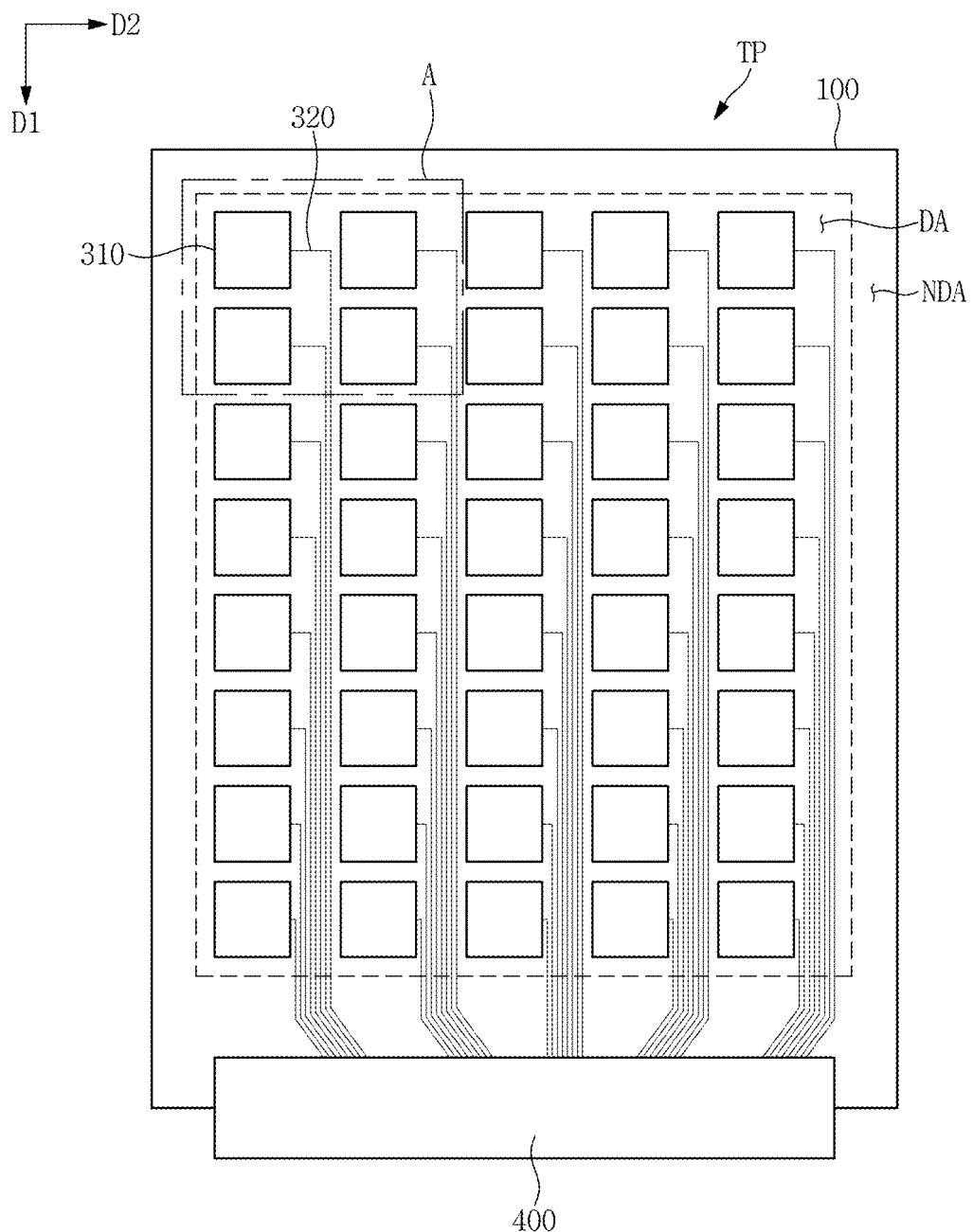
FIG. 2 is a plan view illustrating an exemplary embodiment of a touch panel.
Figure 3:
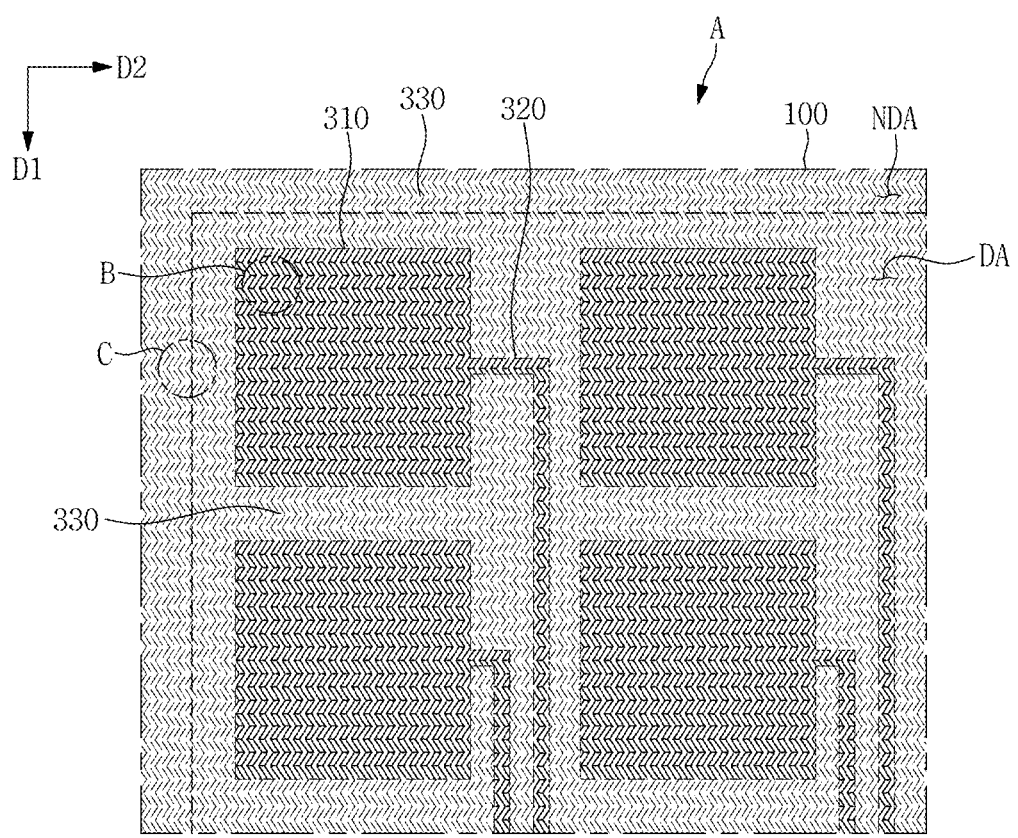
FIG. 3 is an enlarged view of the area "A" shown in FIG. 2.

FIG. 2 is a plan view illustrating an exemplary embodiment of the touch panel TP, and FIG. 3 is an enlarged view of the area "A" shown in FIG. 2.

Referring to FIGS. 2 and 3, the touch panel TP may include the substrate 100, the plurality of sensor electrodes 310 disposed on the substrate 100, the plurality of routing wirings 320 that are disposed on the substrate 100 and connected to respective ones of the sensor electrodes 310, a dummy pattern 330, and the touch driving unit 400.

The substrate 100 may include a display area DA in which the plurality of sensor electrodes 310 are disposed and a non-display area NDA surrounding the display area DA. The substrate 100 may include a transparent material such as glass or plastic.

The sensor electrode 310, the routing wiring 320, and the dummy pattern 330 may be disposed on substantially the same layer on the substrate 100. The dummy pattern 330 may be insulated from the sensor electrode 310 and the routing wiring 320. That is, the dummy pattern 330 may be spaced apart from the sensor electrode 310 and the routing wiring 320 in a plan view.

The plurality of sensor electrodes 310 may be disposed on the substrate 100 in a matrix form.

An exemplary embodiment of the sensor electrode 310 is depicted as having a substantially quadrangular shape, but exemplary embodiments are not limited thereto. The sensor electrode 310 may have various shapes such as a triangular shape, a lozenge shape, a circular shape, an elliptical shape, a semicircular shape, a polygonal shape, and any combination thereof. For example, the sensor electrode 310 may have a combined shape of a lozenge shape and a triangular shape.

An end portion of the routing wiring 320 may be connected to each of the sensor electrodes 310, and another end portion of the routing wiring 320 may be connected to the touch driving unit 400. The touch driving unit 400 may input various signals for driving the touch panel TP and may recognize the presence of a touch input and coordinates of the touch input based on a capacitance variation or a voltage variation measured by the sensing electrode 310.

Various signals from the touch driving unit 400 are provided to each of the sensor electrodes 310 through the routing wiring 320, and sensing signals sensed by the sensor electrodes 310 are sent to the touch driving unit 400 through the routing wiring 320.

The touch driving unit 400 may be directly disposed on the substrate 100 as an integrated circuit (IC) form, or may be provided as a separate configuration such as a printed circuit board ("PCB") or a flexible printed circuit board ("FPCB").

The dummy pattern 330 may be disposed among the sensor electrodes 310, among the sensor electrodes 310 and the routing wirings 320, and among the routing wirings 320. In addition, the dummy pattern 330 may be disposed in the non-display area NDA of the substrate 100 in which the sensor electrodes 310 are absent. That is, the dummy pattern 330 may be disposed in substantially an entire area of the substrate 100 other than an area in which the sensor electrodes 310 and the routing wirings 320 are disposed.

The dummy pattern 330 may be floated, not externally applied with a driving signal or a voltage.

According to one embodiment, the dummy pattern 330 has a substantially similar shape as the patterns of the sensor electrodes 310 and the routing wirings 320. In this case, the dummy pattern 330 is disposed on a portion of the substrate 100 on which the sensor electrodes 310 and the routing wirings 320 are not disposed, therefore a boundary of the sensor electrodes 310 and the routing wirings 320 may be significantly less visually recognized.

Figure 4:
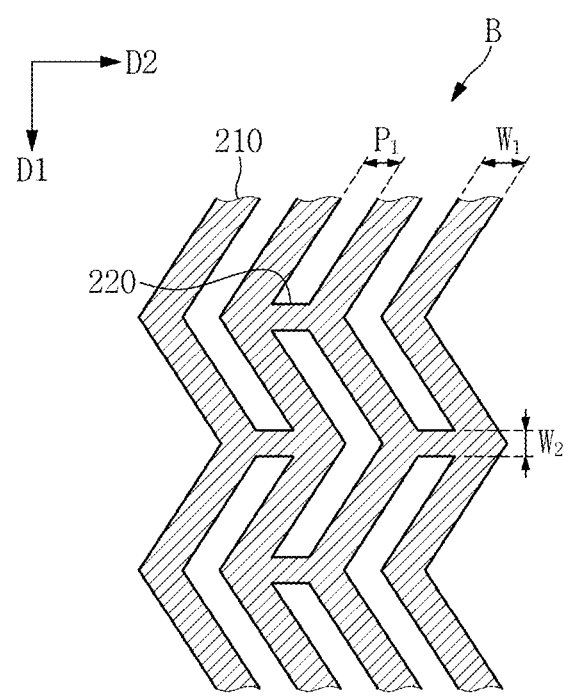
FIG. 4 is an enlarged view of the area "B" shown in FIG. 3.

FIG. 4 is an enlarged view of the area "B" shown in FIG. 3 illustrating a portion of the sensor electrode 310.

Referring to FIG. 4, the sensor electrode 310 may include a first mesh pattern 210 extending substantially in one direction (e.g., the first direction D1) and a second mesh pattern 220 connecting adjacent first mesh patterns 210 along a direction (e.g., the second direction D2) that intersects the extending direction of the first mesh pattern 210.

According to one embodiment, the first mesh pattern 210 may extend in a zig-zag pattern along the first direction D1. The second mesh pattern 220 is depicted in FIG. 4 as branching off from a bent point of the first mesh pattern 210 and extending therefrom, but exemplary embodiments are not limited thereto. The second mesh pattern 220 may branch off from a different predetermined portion of the first mesh pattern 210 and extend therefrom.

In an exemplary embodiment, the first mesh pattern 210 may have a line width W1 ranging from about 10 µm to about 20 µm, and the second mesh pattern 220 may have a line width W2 ranging from about 10 µm to about 20 µm. A pitch P1 between adjacent first mesh patterns 210 along the second direction D2 may be in a range of about 10 μm to about 50 μm.

In an exemplary embodiment, the first mesh pattern 210 and the second mesh pattern 220 may include metal or transparent conductive oxide (TCO). TCO may include at least one or more of: indium tin oxide (ITO), indium zinc oxide (IZO), zinc oxide (ZnO), carbon nanotube (CNT), and graphene.

According to one embodiment, the routing wiring 320, similar to the sensor electrode 310, may include a first mesh pattern 210 extending substantially in one direction (e.g., the first direction D1) and a second mesh pattern 220 connecting adjacent first mesh patterns 210 along a direction (e.g., the second direction D2) that intersects the extending direction of the first mesh pattern 210.

Figure 5:
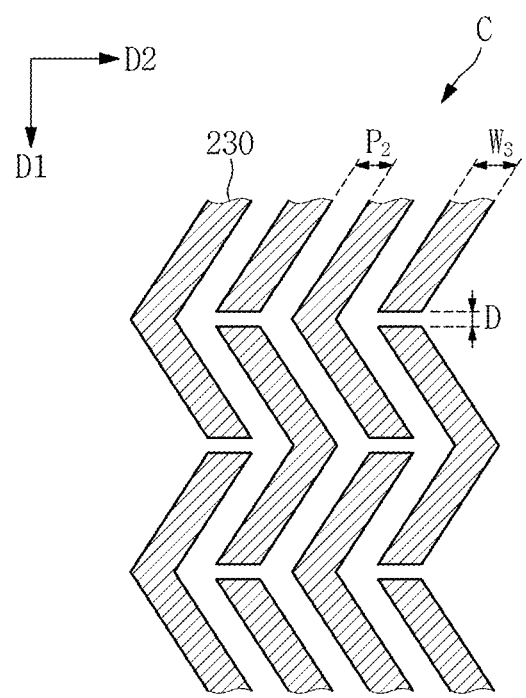
FIG. 5 is an enlarged view of the area "C" shown in FIG. 3.

FIG. 5 is an enlarged view of the area "C" shown in FIG. 3 illustrating a portion of the dummy pattern 330.

Referring to FIG. 5, the dummy pattern 330 may include a third mesh pattern 230 extending substantially in one direction (e.g., the first direction D1) and disconnected at one or more portions of the third mesh pattern 230 on an extension path of the third mesh pattern 230.

According to one embodiment, the third mesh pattern 230 may extend in a zig-zag pattern along the first direction D1. The third mesh pattern 230 is depicted in FIG. 5 as being disconnected at a bent point of the third mesh pattern 230, but exemplary embodiments are not limited thereto. The third mesh pattern 230 may be disconnected at a different predetermined portion of the third mesh pattern 230.

A width D of the disconnected portion of the third mesh pattern 230 may be in a range of about 10 μm to about 20 μm.

As the number of disconnected portions of the third mesh pattern 230 increases, the dummy pattern 330 can more effectively prevent short-circuit defects.

An exemplary embodiment of the third mesh pattern 230 may have a line width W3 in a range of about 10 μm to about 20 μm, and a pitch P2 between adjacent third mesh patterns 230 along the second direction D2 may be in a range of about 10 μm to about 50 μm.

An exemplary embodiment of the third mesh pattern 230 may include metal or TCO. TCO may include at least one or more of: ITO, IZO, ZnO, CNT, and graphene.

In an exemplary embodiment of the dummy pattern 330, in comparison to the sensor electrode 310 or the routing wiring 320, a pattern for connecting the third mesh patterns 230 includes one or more disconnected portions. Accordingly, the dummy pattern 330 may have a smaller conductor area per unit area of the substrate, as compared to those of the sensor electrode 310 or the routing wiring 320.

In an alternative exemplary embodiment, the dummy pattern 330 may further include a fourth mesh pattern (not illustrated) connecting adjacent third mesh patterns 230. Similar to the third mesh pattern 230, the fourth mesh pattern may be disconnected at one or more portions.

In an alternative exemplary embodiment of the dummy pattern 330, the fourth mesh pattern may further be included or the disconnected area of the third mesh pattern 230 may be reduced so that the conductor area per unit area of the substrate may increase.

Figure 6:
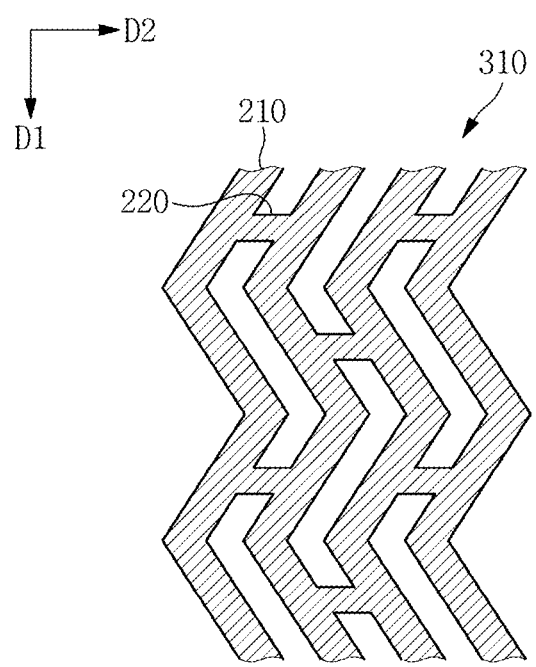
FIGS. 6 and 7 are views illustrating a portion of a sensor electrode and a dummy pattern, according to another embodiment.
Figure 7:
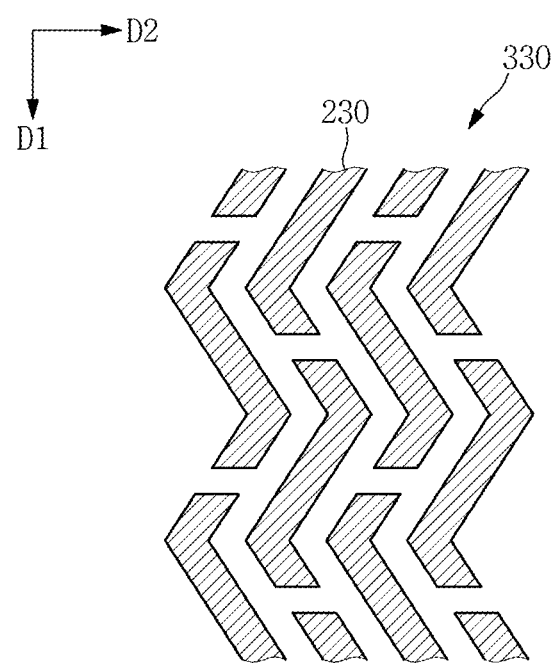

FIGS. 6 and 7 are views illustrating a portion of the sensor electrode and the dummy pattern, according to another embodiment.

Referring to FIG. 6, the sensor electrode 310 may include a first mesh pattern 210 extending in a zig-zag pattern along one direction (e.g., the first direction D1) and a second mesh pattern 220 connecting adjacent first mesh patterns 210 along a direction (e.g., the second direction D2) that intersects the extending direction of the first mesh pattern 210. The second mesh pattern 220 may branch off from a predetermined portion of the first mesh pattern 210 and extend therefrom.

Referring to FIG. 7, the dummy pattern 330 may include a third mesh pattern 230 extending in a zig-zag pattern along one direction (e.g., the first direction D1) and disconnected at one or more portions of the third mesh pattern 230 on an extension path of the third mesh pattern 230. The third mesh pattern 230 may be disconnected at a predetermined portion of the third mesh pattern 230.

Figure 8:
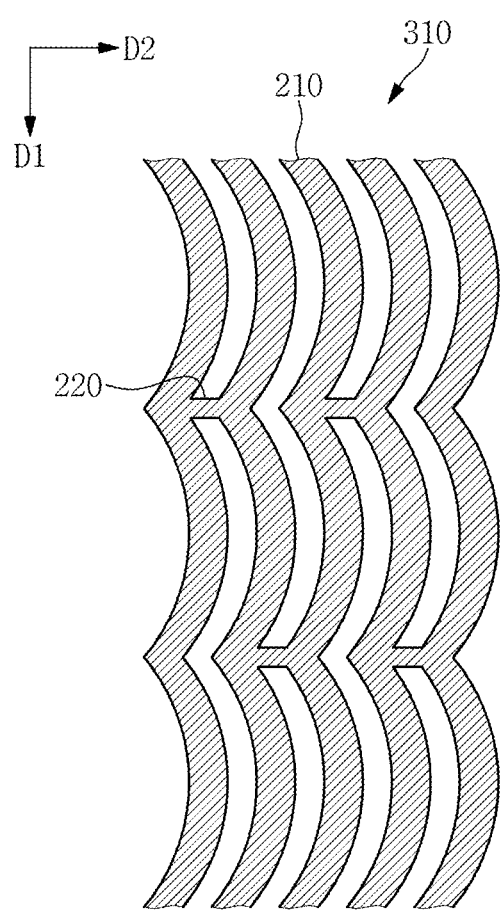
FIGS. 8 and 9 are views illustrating a portion of the sensor electrode and the dummy pattern, according to yet another embodiment.
Figure 9:
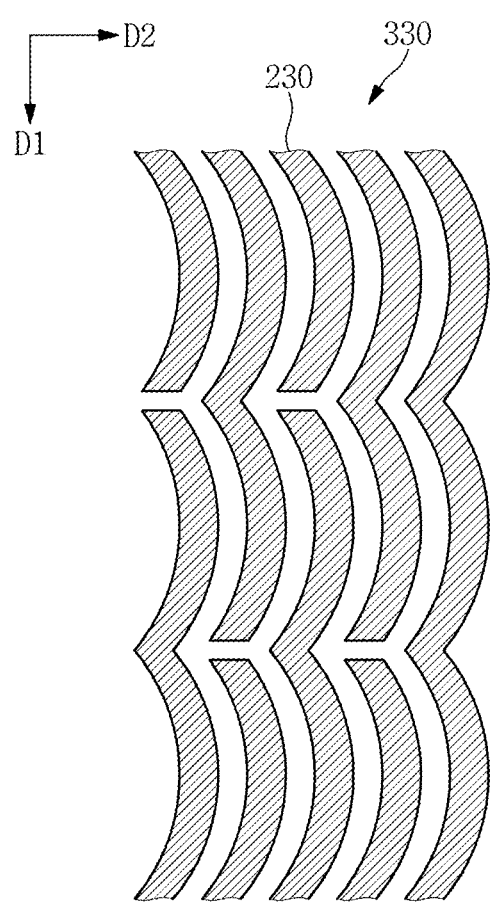

FIGS. 8 and 9 are views illustrating a portion of the sensor electrode and the dummy pattern, according to yet another embodiment.

Referring to FIG. 8, the sensor electrode 310 may include a first mesh pattern 210 extending in a curved pattern along one direction (e.g., the first direction D1) and a second mesh pattern 220 connecting adjacent first mesh patterns 210 in a direction (e.g., the second direction D2) that intersects the extending direction of the first mesh pattern 210.

Referring to FIG. 9, the dummy pattern 330 may include a third mesh pattern 230 extending in a curved pattern along one direction (e.g., the first direction D1) and disconnected at one or more portions of the third mesh pattern 230 on an extension path of the third mesh pattern 230. The third mesh pattern 230 may be disconnected at a bent portion of the third mesh pattern 230 or a different predetermined portion of the third mesh pattern 230.

Figure 10:
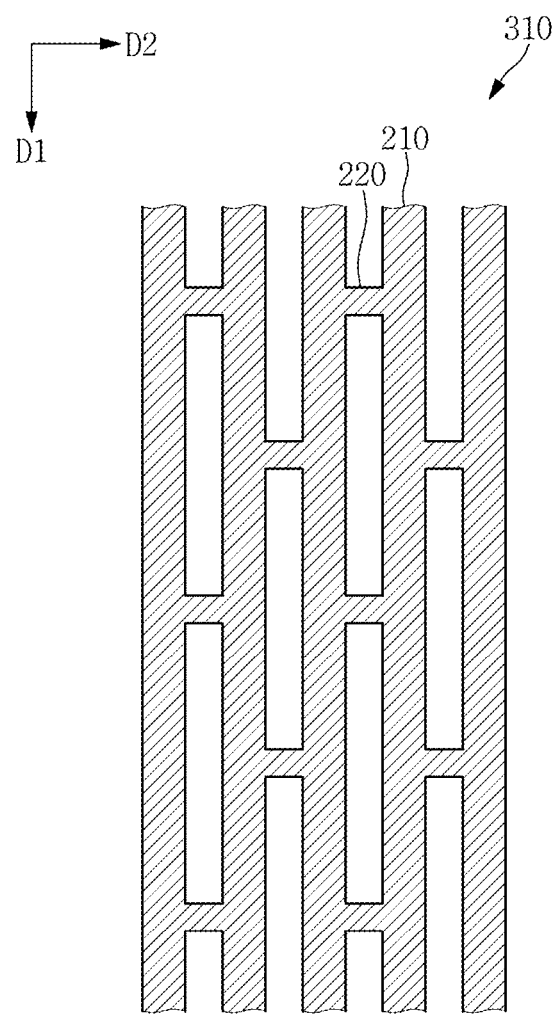
FIGS. 10 and 11 are views illustrating a portion of the sensor electrode and the dummy pattern, according to yet another embodiment.
Figure 11:
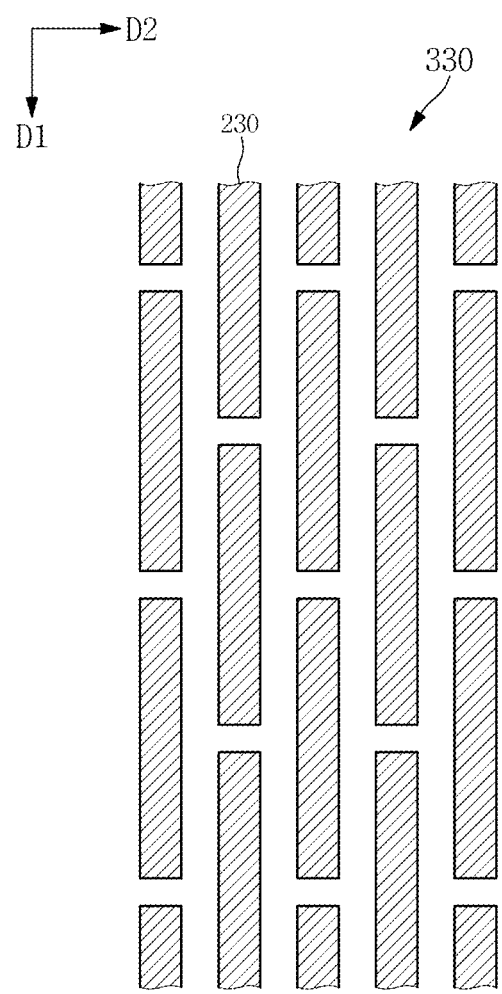

FIGS. 10 and 11 are views illustrating a portion of the sensor electrode and the dummy pattern, according to yet another embodiment.

Referring to FIG. 10, the sensor electrode 310 may include a first mesh pattern 210 extending in a linear pattern along one direction (e.g., the first direction D1) and a second mesh pattern 220 connecting adjacent first mesh patterns 210 in a direction (e.g., the second direction D2) that intersects the extending direction of the first mesh pattern 210.

Referring to FIG. 11, the dummy pattern 330 may include a third mesh pattern 230 extending in a linear pattern along one direction (e.g., the first direction D1) and disconnected at one or more portions of the third mesh pattern 230 on an extension path of the third mesh pattern 230. The third mesh pattern 230 may be disconnected at a predetermined portion of the third mesh pattern 230.

FIGS. 12A, 12B, 13A, 13B, 14A, 14B, 15A, and 15B are views illustrating an exemplary embodiment of the sensor electrode 310 and the dummy pattern 330.

Hereinafter, for ease of description, an area of the sensor electrode 310 with respect to a unit area of the substrate is referred to as a first area ratio, an area of the dummy pattern 330 with respect to the unit area of the substrate is referred to as a second area ratio, and an area of the routing wiring 320 with respect to the unit area of the substrate is referred to as a third area ratio.

In detail, FIGS. 12A, 13A, 14A, and 15A illustrate the sensor electrodes 310 and the dummy patterns 330 of an exemplary touch panel, having different first area ratios and different second area ratios, respectively.

In addition, FIGS. 12B, 13B, 14B, and 15B illustrate simulation images of the sensor electrodes 310 and the dummy patterns 330 of FIGS. 12A, 13A, 14A, and 15A as being visually recognized.

Figure 12A:
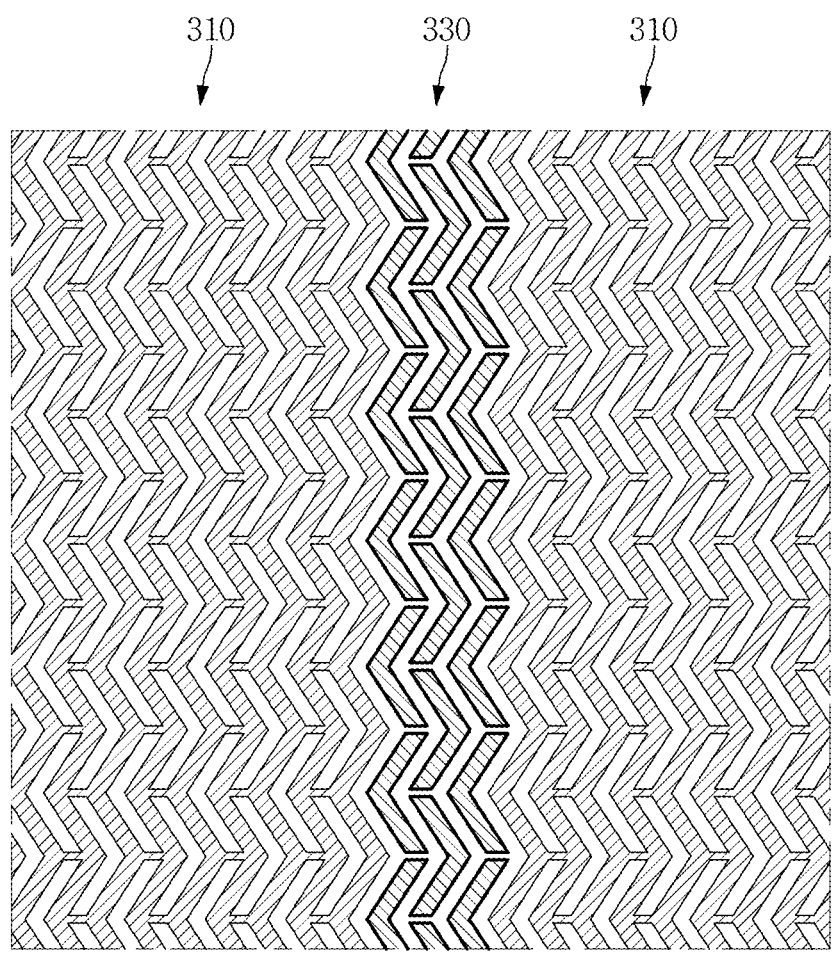
FIGS. 12A, 12B, 13A, 13B, 14A, 14B, 15A, and 15B are views illustrating an exemplary embodiment of the sensor electrode and the dummy pattern.

Referring to FIG. 12A, the first area ratio of the sensor electrode 310 is about 52.8%, the second area ratio of the dummy pattern 330 is about 45.1%, and a ratio of the second area ratio to the first area ratio is about 85.4%.

Figure 12B:
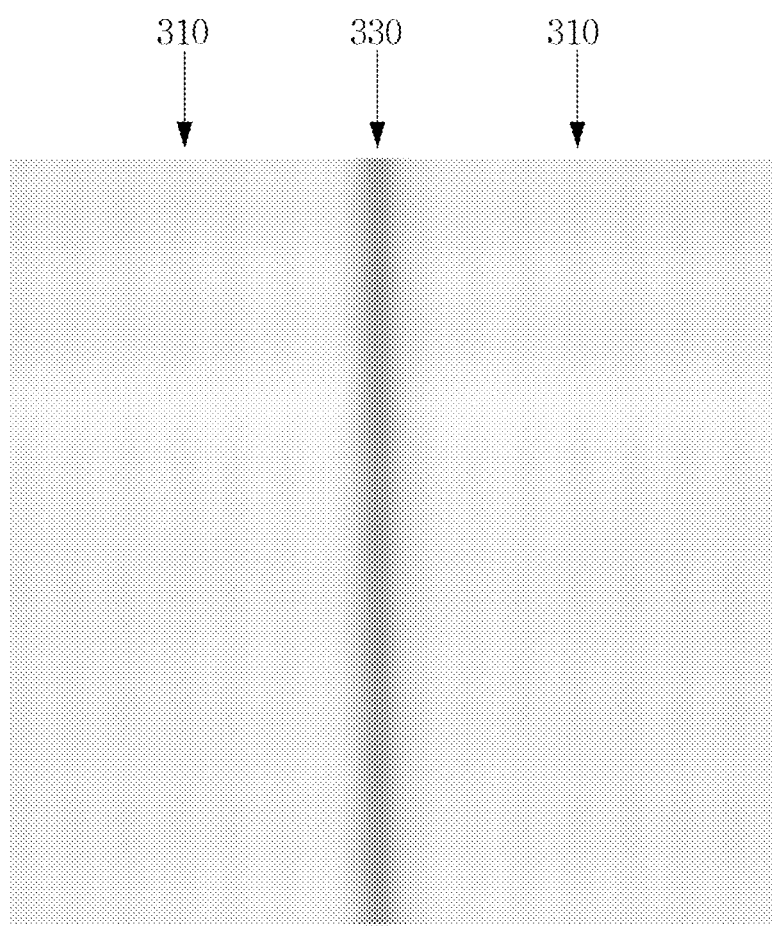

Referring to FIG. 12B, when the ratio of the second area ratio to the first area ratio is about 85.4% as in the example of FIG. 12A, an edge portion of the sensor electrode 310, that is, the dummy pattern 330, is partly visually recognizable.

Figure 13A:
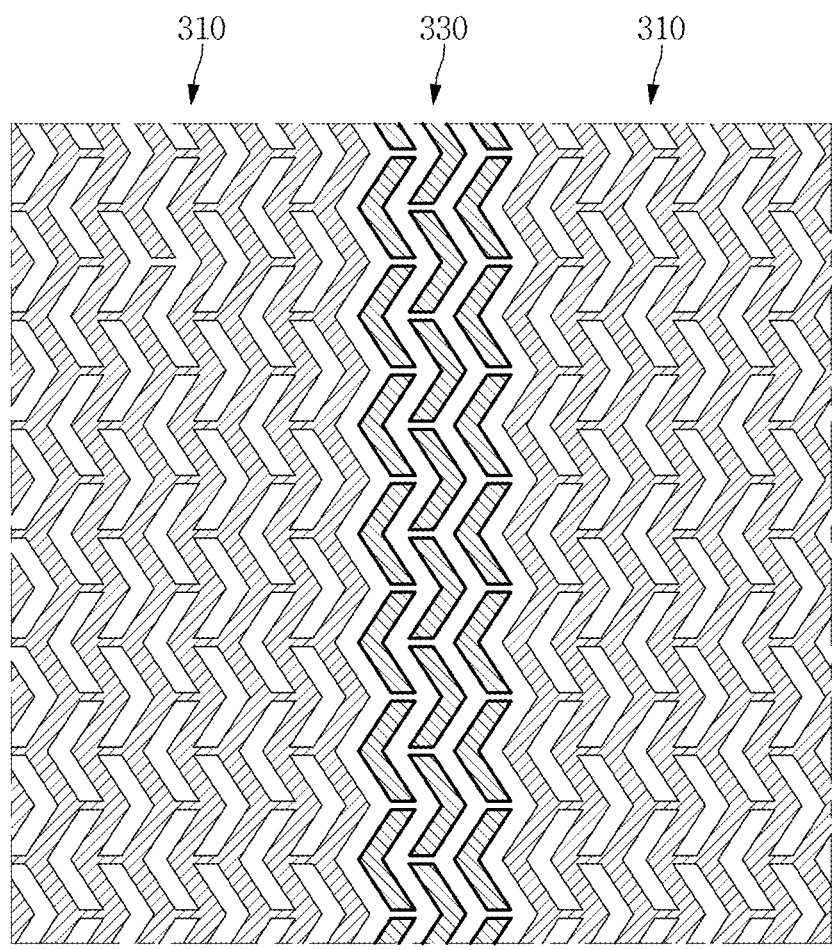

Referring to FIG. 13A, the first area ratio of the sensor electrode 310 is about 64.5%, the second area ratio of the dummy pattern 330 is about 57.0%, and the ratio of the second area ratio to the first area ratio is about 88.4%.

Figure 13B:
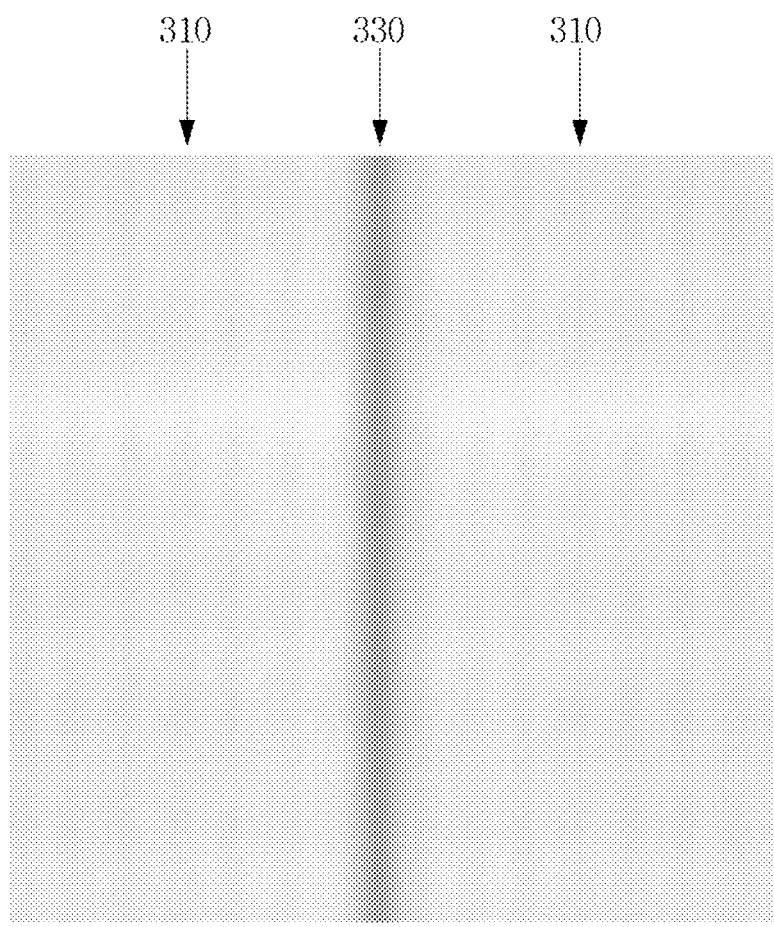

Referring to FIG. 13B, when the ratio of the second area ratio to the first area ratio is about 88.4% as in the example of FIG. 13A, an edge portion of the sensor electrode 310, that is, the dummy pattern 330, is partly visually recognizable, but is relatively less recognizable, as compared to that of FIG. 12B.

Figure 14A:
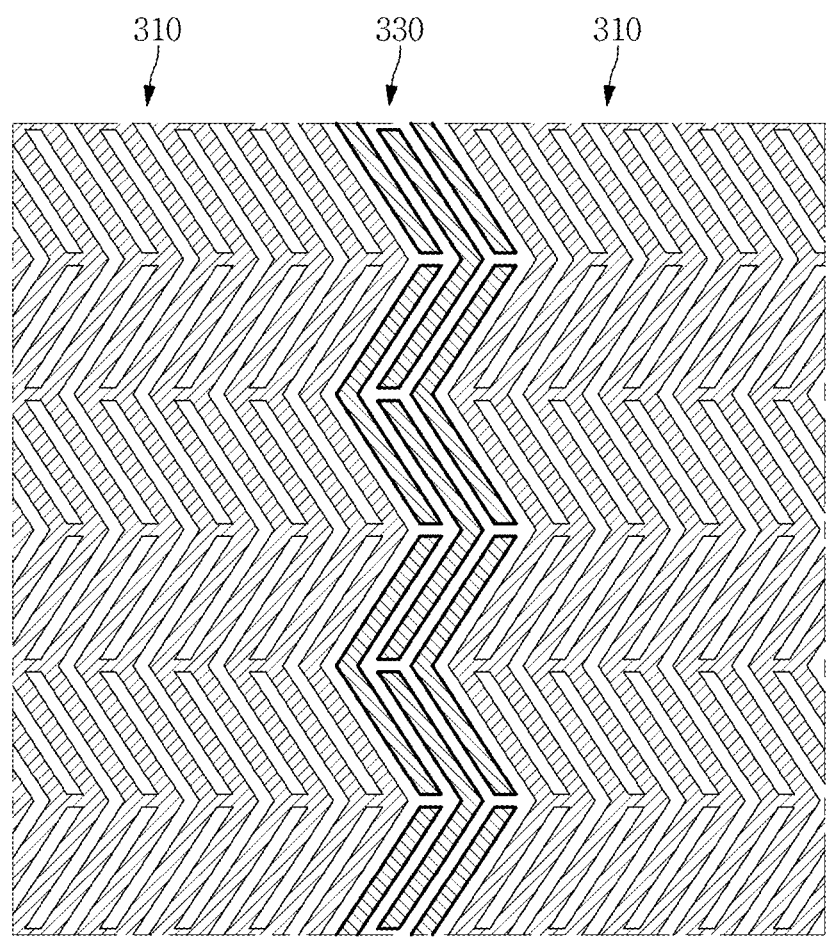

Referring to FIG. 14A, the first area ratio of the sensor electrode 310 is about 57.5%, the second area ratio of the dummy pattern 330 is about 52.5%, and the ratio of the second area ratio to the first area ratio is about 91.3%.

Figure 14B:
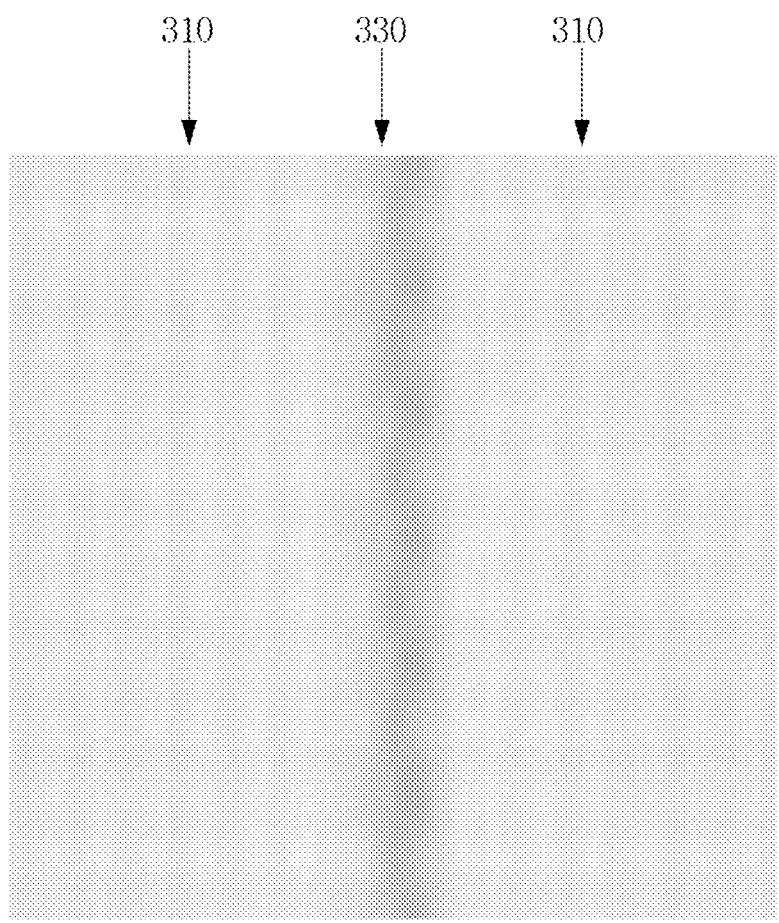

Referring to FIG. 14B, when the ratio of the second area ratio to the first area ratio is about 91.3% as in the example of FIG. 14A, an edge portion of the sensor electrode 310, that is, the dummy pattern 330, is significantly less visually recognizable, as compared to those of FIGS. 12B and 13B.

Figure 15A:
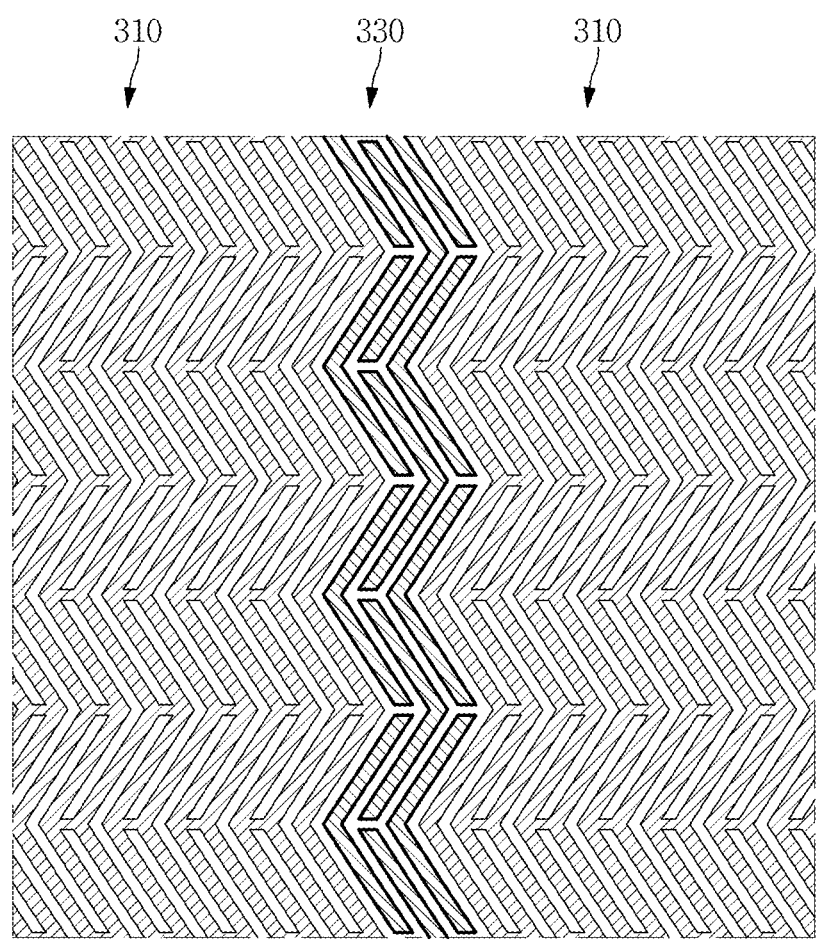

Referring to FIG. 15A, the first area ratio of the sensor electrode 310 is about 61.1%, the second area ratio of the dummy pattern 330 is about 57.0%, and the ratio of the second area ratio to the first area ratio is about 93.2%.

Figure 15B:
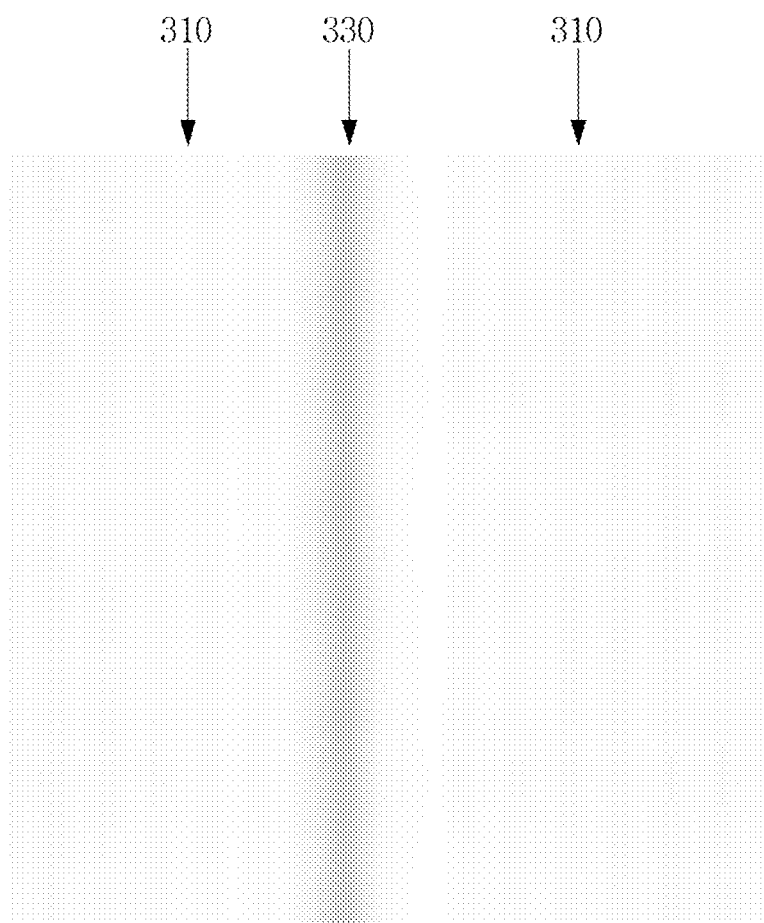

Referring to FIG. 15B, when the ratio of the second area ratio to the first area ratio is about 93.2% as in the example of FIG. 15A, an edge portion of the sensor electrode 310, that is, the dummy pattern 330, is substantially not visually recognizable.

The above examples are summarized in Table 1.

TABLE 1

|  | #1 | #2 | #3 | #4 |
|---|---|---|---|---|
| 1st area ratio (sensor electrode) | 52.8% | 64.5% | 57.5% | 61.1% |
| 2nd area ratio (dummy pattern) | 45.1% | 57.0% | 52.5% | 57.0% |
| 2nd area ratio over 1st area ratio | 85.4% | 88.4% | 91.3% | 93.2% |

As the ratio of the second area ratio to the first area ratio increases, the edge portion of the sensor electrode 310, that is, the dummy pattern 330, may be less visually recognizable.

According to one embodiment, the touch panel may be designed to have a ratio of the second area ratio to the first area ratio to be about 90% or more so that the edge portion of the sensor electrode 310 may be significantly less visually recognizable to provide an improved display quality.

In addition, the touch panel may be designed to have a ratio of the second area ratio to the first area ratio to be about 100% or less, such that short-circuit defects may be effectively prevented in the dummy pattern 330.

Accordingly, the touch panel may be designed to have a ratio of the second area ratio to the first area ratio in a range of about 90% to about 100%, such that the short-circuit defects may be effectively prevented in the dummy pattern 330, and the edge portion of the routing wiring 320 may be significantly less visually recognizable.

In an exemplary embodiment of the touch panel, the sensor electrode 310 and the routing wiring 320 may have a substantially same pattern.

The second area ratio of the dummy pattern 330 may be adjusted by further disposing a fourth mesh pattern that connects the adjacent ones of the third mesh patterns or reducing disconnected portions of the third mesh pattern.

FIGS. 16A, 16B, 17A, and 17B are views illustrating an exemplary embodiment of the sensor electrode and the dummy pattern.

Figure 16A:
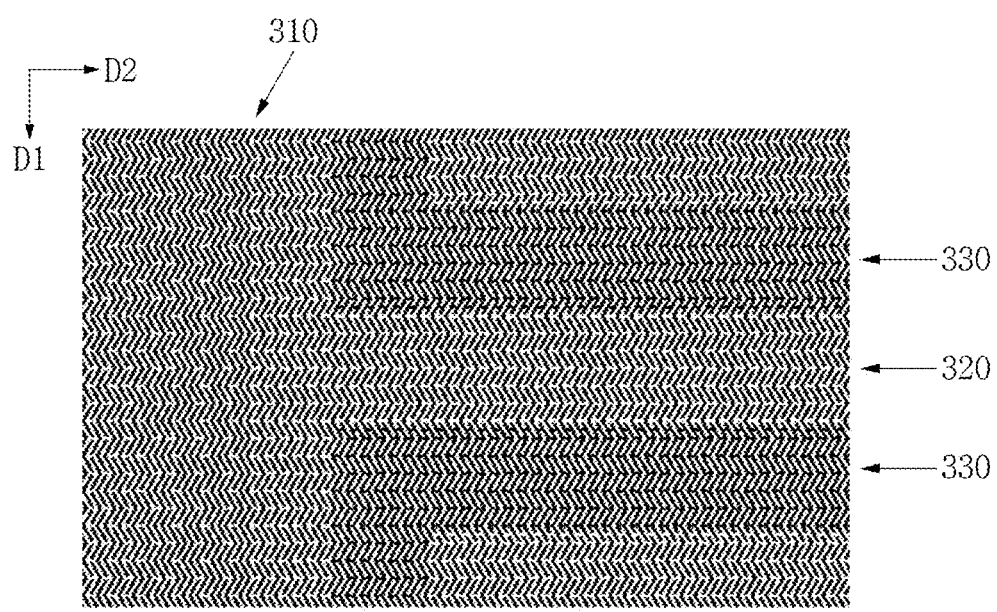
FIGS. 16A, 16B, 17A, and 17B are views illustrating an exemplary embodiment of the sensor electrode and the dummy pattern.
Figure 17A:
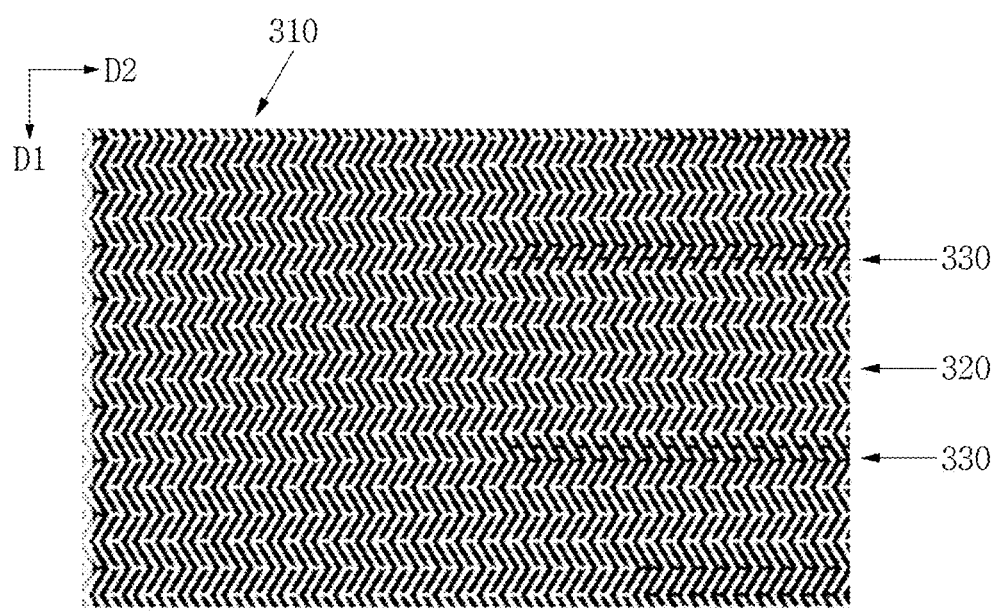

In detail, FIGS. 16A and 17A illustrate the sensor electrodes 310, the dummy patterns 330, and routing wirings 320 of an exemplary touch panel, having different first area ratios, different second area ratios, and different third area ratios, respectively.

Figure 16B:
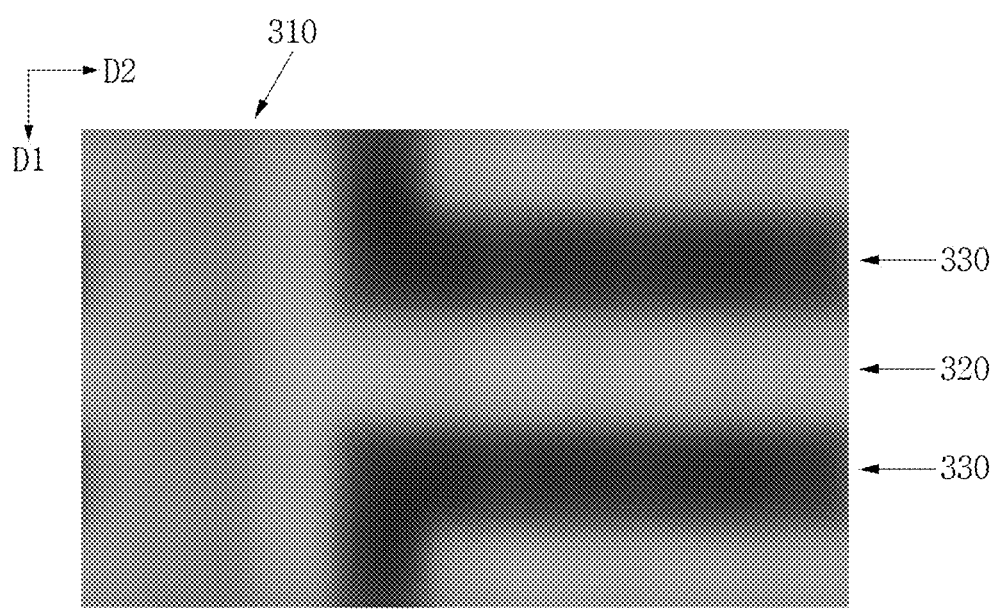
Figure 17B:
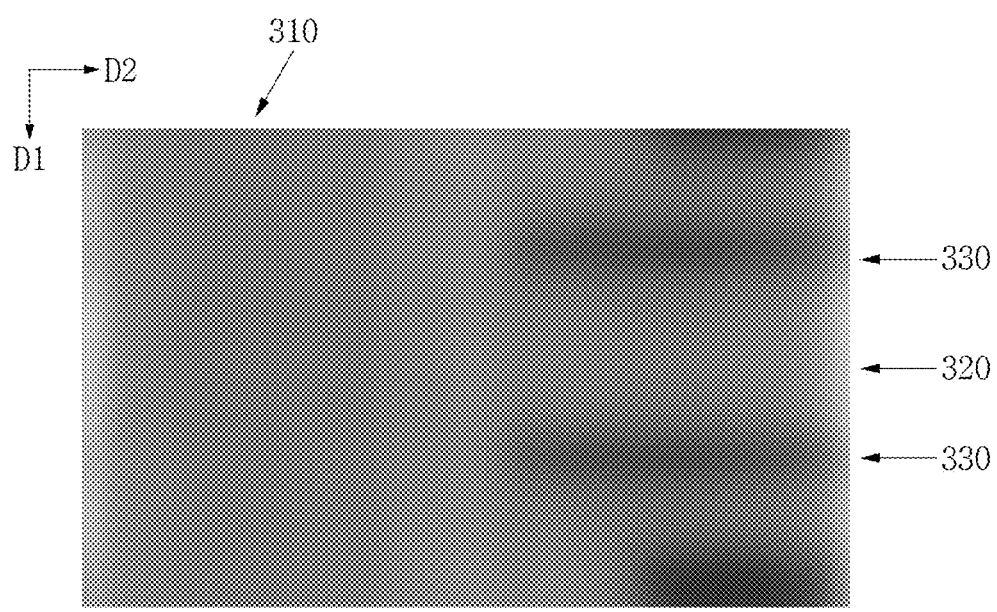

In addition, FIGS. 16B and 17B illustrate simulation images of the sensor electrodes 310, the dummy patterns 330, and the routing wirings 320 of FIGS. 16A and 17A as being visually recognizable.

FIG. 16A illustrates the dummy pattern 330 only including a third mesh pattern extending in the first direction D1.

Referring to FIG. 16B, when the dummy pattern 330 includes only the third mesh pattern as in the example of FIG. 16A, and an edge portion of the sensor electrode 310 and the routing wiring 320 may be partly visually recognizable.

FIG. 17A illustrates the dummy pattern 330 including a third mesh pattern extending in the first direction D1 and a fourth mesh pattern connecting the adjacent ones of the third mesh patterns. The dummy pattern 330 including the fourth mesh pattern has a ratio of the second area ratio to the first area ratio to be about 90% or more.

Referring to FIG. 17B, the ratio of the second area ratio to the first area ratio is about 90% or more as in the example of FIG. 17A, the sensor electrode 310 and the routing wiring 320 may not be substantially visually recognizable.

As set forth hereinabove, in one or more exemplary embodiments of the touch panel and the display device including the touch panel, the sensor electrode and the routing wiring may be significantly less visually recognizable by disposing the dummy pattern on a portion of the substrate on which the sensor electrode and the routing wiring are not disposed.

Further, in one or more exemplary embodiments of the touch panel and the display device including the touch panel, the sensor electrode and the routing wiring may be significantly less visually recognizable by adjusting an area ratio of the routing wiring or the sensor electrode having a mesh shape and an area ratio of the dummy pattern having a mesh shape.

While the present disclosure has been shown and described with reference to the exemplary embodiments thereof, it will be apparent to those of ordinary skill in the art that various changes in form and detail may be made thereto without departing from the spirit and scope of the present disclosure.

What is claimed is:

1. A touch panel comprising:
a substrate;
a plurality of sensor electrodes disposed on the substrate; and
a dummy pattern disposed on the substrate among the plurality of sensor electrodes, wherein each of the plurality of sensor electrodes comprises a plurality of first mesh patterns extending in a first direction and a plurality of second mesh patterns connecting adjacent ones of the plurality of first mesh patterns in a second direction,
wherein the dummy pattern comprises a plurality of third mesh patterns extending in the first direction and one or more disconnected portions on an extension path of the plurality of third mesh patterns, wherein one third mesh pattern has the same shape as a mesh hole defined by the plurality of first mesh patterns and the plurality of second mesh patterns in a plan view, the one third mesh pattern not being connected to other third mesh patterns, and wherein the mesh hole boundary is continuous and unbroken.

2. The touch panel as claimed in claim 1, wherein the dummy pattern and the plurality of sensor electrodes are disposed on a same layer.

3. The touch panel as claimed in claim 2, wherein the dummy pattern is spaced apart from the plurality of sensor electrodes in the plan view.

4. The touch panel as claimed in claim 1, further comprising a plurality of routing wirings connected to the plurality of sensor electrodes, respectively.

5. The touch panel as claimed in claim 4, wherein the plurality of routing wirings and the plurality of sensor electrodes have a substantially same pattern.

6. The touch panel as claimed in claim 4, wherein the dummy pattern is disposed among the plurality of sensor electrodes and the plurality of routing wirings.

7. The touch panel as claimed in claim 4, wherein the dummy pattern is disposed among the plurality of routing wirings.

8. The touch panel as claimed in claim 4, wherein the dummy pattern is disposed at an edge portion of the substrate.

9. The touch panel as claimed in claim 4, wherein the dummy pattern is disposed substantially in an entire area of the substrate except areas in which the plurality of sensor electrodes and the plurality of routing wirings are disposed.

10. The touch panel as claimed in claim 1, wherein the plurality of sensor electrodes are disposed on the substrate in a matrix form.

11. The touch panel as claimed in claim 1, wherein each of the plurality of sensor electrodes has a shape selected from: a substantially quadrangular shape, a substantially triangular shape, a substantially lozenge shape, a substantially circular shape, a substantially elliptical shape, a substantially semicircular shape, a substantially polygonal shape, and any combination thereof.

12. The touch panel as claimed in claim 1, wherein the dummy pattern further comprises a plurality of fourth mesh patterns connecting adjacent ones of the plurality of third mesh patterns.

13. The touch panel as claimed in claim 12, wherein each of the plurality of fourth mesh patterns is disconnected at one or more portions of the adjacent ones of the plurality of third mesh patterns.

14. The touch panel as claimed in claim 12, wherein each of the plurality of first mesh patterns, the plurality of second mesh patterns, the plurality of third mesh patterns, and the plurality of fourth mesh patterns comprises one or more of: indium tin oxide (ITO), indium zinc oxide (IZO), zinc oxide (ZnO), carbon nanotube (CNT), and graphene.

15. The touch panel as claimed in claim 1, wherein each of the plurality of first mesh patterns has one of a linear shape, a curved shape, and a zig-zag shape.

16. The touch panel as claimed in claim 1, wherein each of the plurality of third mesh patterns has one of a linear shape, a curved shape, and a zig-zag shape.

17. The touch panel as claimed in claim 1, wherein, when an area of the plurality of sensor electrodes with respect to a unit area of the substrate is defined as a first area ratio, and an area of the dummy pattern with respect to the unit area of the substrate is defined as a second area ratio, a ratio of the second area ratio to the first area ratio is in a range of about 90% to about 100%.

18. The touch panel as claimed in claim 4, wherein, when an area of the dummy pattern with respect to a unit area of the substrate is defined as a second area ratio, and an area of the plurality of routing wirings with respect to the unit area of the substrate is defined as a third area ratio, a ratio of the second area ratio to the third area ratio is in a range of about 90% to about 100%.

19. A display device comprising:

a display panel comprising a plurality of pixels; and a touch panel disposed on the display panel, wherein the touch panel comprises: a substrate; a plurality of sensor electrodes disposed on the substrate; and a dummy pattern disposed on the substrate among the plurality of sensor electrodes, wherein each of the plurality of sensor electrodes comprises: a plurality of first mesh patterns and a plurality of second mesh patterns connecting adjacent ones of the plurality of first mesh patterns, wherein each of the plurality of first mesh patterns includes a first portion extending in a first extending direction and a second portion extending in a second extending direction, and a mesh hole is defined as being bounded by at least one of the plurality of first mesh patterns and at least one of the plurality of second mesh patterns in a plan view, and a boundary of the mesh hole is continuous and unbroken, wherein the dummy pattern comprises a plurality of third mesh patterns, each of the plurality of third mesh patterns having one or more disconnected portions on an extension path of the plurality of third mesh patterns, and wherein one third mesh pattern occupies an area having a same shape as the mesh hole in the plan view, the one third mesh pattern including a first dummy portion extending in the first extending direction and a second dummy portion extending in the second extending direction.

20. The display device as claimed in claim 19, wherein, when an area of the plurality of sensor electrodes with respect to a unit area of the substrate is defined as a first area ratio, and an area of the dummy pattern with respect to the unit area of the substrate is defined as a second area ratio, a ratio of the second area ratio to the first area ratio is in a range of about 90% to about 100%.

21. The display device as claimed in claim 19, further comprising a plurality of routing wirings connected to the plurality of sensor electrodes, respectively.

22. The touch panel as claimed in claim 21, wherein, when an area of the dummy pattern with respect to a unit area of the substrate is defined as a second area ratio, and an area of the plurality of routing wirings with respect to the unit area of the substrate is defined as a third area ratio, a ratio of the second area ratio to the third area ratio is in a range of about 90% to about 100%.

23. The touch panel as claimed in claim 1, wherein the one third mesh pattern has a same size as the mesh hole.

* * * * *